United States Patent [19]

Stauffer

[11] Patent Number: 5,344,529

[45] Date of Patent: Sep. 6, 1994

[54] BIPOLAR PROCESS FOR REMOVAL OF SULFUR DIOXIDE FROM WASTE GASES

[76] Inventor: John E. Stauffer, 6 Pecksland Rd., Greenwich, Conn. 06831

[21] Appl. No.: 76,982

[22] Filed: Jun. 15, 1993

Related U.S. Application Data

[63] Continuation-in-part of Ser. No. 886,535, May 20, 1992, abandoned, which is a continuation-in-part of Ser. No. 717,222, Jun. 17, 1991, abandoned.

[51] Int. Cl.[5] .......................... C25B 1/00; C25B 1/02
[52] U.S. Cl. ................... 204/101; 204/129; 204/130; 204/242; 204/272
[58] Field of Search ............. 204/101, 104, 103, 129, 204/130, 272, 242; 55/216, 7.8, 10

[56] References Cited

U.S. PATENT DOCUMENTS 4,004,994 1/1977 Andrus .................. 204/149
4,830,178 5/1989 Stauffer ................. 204/104

Primary Examiner—Kathryn Gorgos
Attorney, Agent, or Firm—Krass & Young

[57] ABSTRACT

A process for removing sulfur dioxide ($SO_2$) from a waste gas stream and recovering the sulfur values as sulfuric acid. The sources of the waste gas stream include effluent vent, flue or exhaust gases from power plants, sulfuric acid plants, ore roasters, and solid waste incinerators. The purpose of the process is to achieve economies of operation, provide a useful byproduct, and minimize environmental pollution.

9 Claims, 1 Drawing Sheet

BIPOLAR PROCESS FOR REMOVAL OF SULFUR DIOXIDE FROM WASTE GASES

REFERENCE TO RELATED APPLICATION

This application is a continuation-in-part of my copending application Ser. No. 886,535, filed May 20, 1992, now abandoned, which is a continuation-in-part of Ser. No. 717,222, filed Jun. 17, 1991, now abandoned.

FIELD OF THE INVENTION

The present invention concerns an improved electrolytic process for removing sulfur dioxide ($SO_2$) from a waste gas stream and recovering the sulfur values as sulfuric acid. The sources of said waste gas stream include effluent vent, flue or exhaust gases from power plants, sulfuric acid plants, ore roasters, and solid waste incinerators. The purpose of the process is to achieve economies of operation, provide a useful byproduct, and minimize environmental pollution.

BACKGROUND OF THE INVENTION

An electrolytic process for the removal of sulfur dioxide from waste gases and recovery as sulfuric acid is described in U.S. Pat. No. 4,830,718. This patent discloses a process for removing sulfur dioxide from effluent vent or flue gas by subjecting the gas cyclically to scrubbing in an acid stream and to electrolysis. The process comprises the steps of scrubbing the gas in a confined scrubbing zone with an aqueous sulfuric acid stream to remove sulfur dioxide from the gas and converting the thus removed sulfur dioxide to sulfurous acid, subjecting the sulfuric acid stream containing the thus produced sulfurous acid to electrolysis in an electrolytic cell to oxidize the sulfurous acid to sulfuric acid, recycling the sulfuric acid stream resulting from the electrolysis step to the scrubbing zone, and maintaining the recycled sulfuric acid within a predetermined range of concentrations by means of make-up water or acid.

The scrubbing zone conveniently is a scrubbing column of conventional design or modified design for passage of a stream of effluent gas therethrough. Preferably, the scrubbing column contains packing material that provides gas-liquid contact surface for the gas stream and the aqueous acid stream. The design of the packing material is critical in order to minimize channeling and thereby achieve greater scrubbing efficiency.

In a favored embodiment of the process, the packing material is electrically conductive, and it serves both as the gas-liquid contact surface for scrubbing and as the electrochemically active surface of the anode of the electrolytic cell. With this configuration, the cathode is located in the electrolytic cell compartment external to the scrubbing column. Electrical contact between the anode and cathode is maintained by the aqueous acid stream flowing through the scrubbing column and the connecting piping leading from the column to the electrolytic cell.

The above configuration has obvious advantages. Hydrogen gas produced at the cathode is kept isolated from the flue gases by means of the aqueous acid seal in the connecting piping. Thus, hydrogen gas cannot intermix with the flue gases forming potentially explosive mixtures. Furthermore, the hydrogen gas formed in the process can be recovered as a useful byproduct for such applications as the production of ammonia. Alternatively, the hydrogen can be burned as a fuel in such general uses as steam generation, or it can be used specifically to reheat the flue gases thereby providing buoyancy to the gases for better dispersibility in the atmosphere.

In practice, however, the methods described for removing sulfur dioxide have serious disadvantages. When both electrodes are installed in the electrolytic cell compartment, large quantities of acid must be recycled between the electrolytic cell and the scrubbing column. Large liquid flow rates are necessitated because of the limited solubility of sulfur dioxide in aqueous acid solutions. This drawback is overcome when the column packing material serves not only as the gas-liquid interface but also as the anode of the electrolytic cell. The absorption equilibrium is shifted to the right by the electrolysis of sulfurous acid to the sulfuric acid.

New problems arise, however, when the column packing material is used for the anode. With this modification, the electrical resistance of the aqueous acid solution between the electrodes is increased significantly. In addition, there results troublesome variations in the voltage potential at different column heights. In large installations, no electrochemical reaction may take place at certain points in the scrubbing tower for lack of sufficient potential. If the voltage is increased, unwanted side reactions can occur at other locations thereby consuming excessive amounts of power. Another concern is the danger of grounding out the electrical current passing through the interconnecting piping. Providing electrical insulation for the lines circulating the aqueous acid solution can prove to be difficult.

It is, therefore, an object of the present invention to provide a process that overcomes the disadvantages of the conventional methods for removing sulfur dioxide from waste gases.

It is also an object to provide a process that is completely safe to operate and which will be acceptable under the most stringent regulations.

A further object is to provide a process requiring the minimum investment and offering the lowest operating costs.

These and other objects, features and advantages of the invention will be apparent from the accompanying drawings, FIGS. 1 and 2, and the following description.

SUMMARY OF THE INVENTION

In one preferred embodiment shown in FIG. 1, the invention concerns a process for removing sulfur dioxide from effluent vent or flue gas by scrubbing the gas with an aqueous acid stream in a column 10 comprising a confined scrubbing zone and simultaneously subjecting this acid stream, which contains dissolved sulfur dioxide, to electrolysis. The confined scrubbing zone contains packing material 20a that is electrically conductive. This packing material both provides gas-liquid contact surface for scrubbing and serves as the electrochemically active surface of a bipolar electrode for the electrolysis reactions. The confined scrubbing zone also contains two electrical contacts which are arranged so that the packing material is spaced between the contacts and is in electrical contact with them. The electrical contacts 32 and 34 are shown as being located one at the top and the other at the bottom of the column packing material.

By conducting the absorption and electrolysis steps in the scrubbing zone, the need for a separate electrolysis cell is eliminated thereby simplifying the process and reducing capital investment. A circulating pump 40 supplies the aqueous acid stream to the scrubbing zone in order to provide effective contact between the gas stream and the liquid phase. The concentration of the aqueous acid stream is maintained within set limits by means of makeup water or acid. Byproduct acid produced by the process is withdrawn from the system.

In another preferred embodiment of the process shown in FIG. 2, the scrubbing zone consists of a column 10 whose inner walls are manufactured from an electrically conductive material. The walls of the column thus serve the dual purposes of confining the process streams and acting as one of the electrical contacts 36. The other electrical contact 38 consists of an electrically conductive cylinder that is centered along the vertical axis of the column. In this configuration, the packing material fills an annular space.

BRIEF DESCRIPTION OF THE DRAWINGS

The invention will be better understood by reference to the preferred embodiments illustrated in the accompanying drawings.

DETAILED DESCRIPTION OF THE PROCESS

Figure 2:
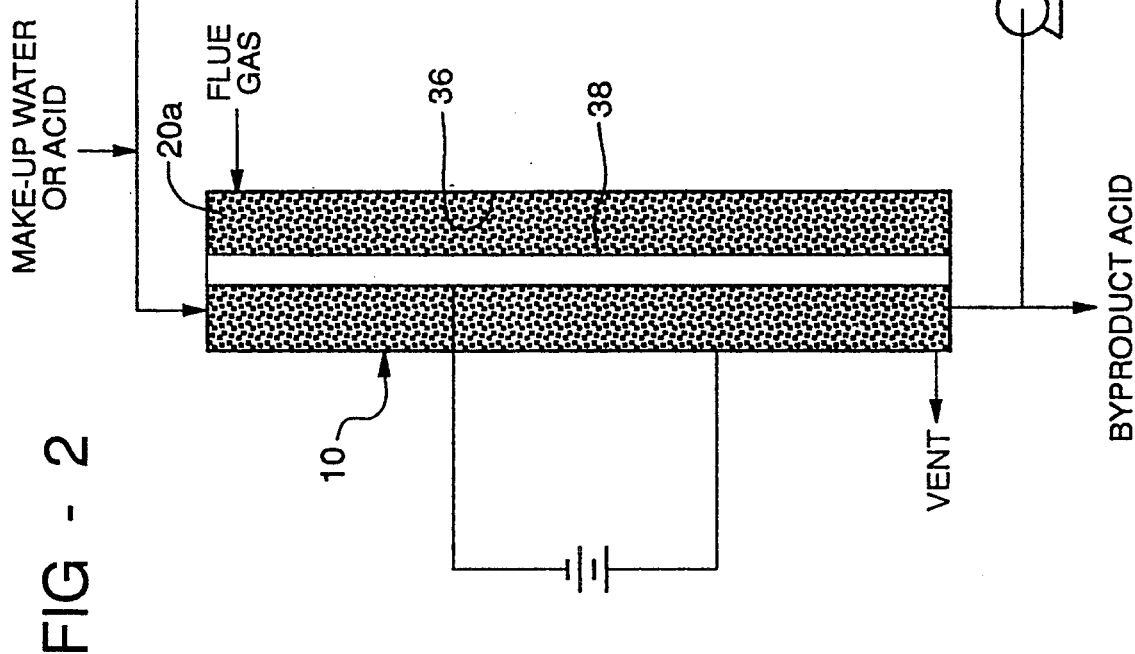
FIG. 2 is another embodiment in which a centrally located cylinder and the inner wall of the column serve as electrical contacts.

Electrolysis is an effective and efficient way to convert sulfurous acid to sulfuric acid when sulfurous acid is formed by stripping sulfur dioxide from waste gases that contain relatively low concentrations of sulfur dioxide. The theoretical potential required for this reaction is 0.2 volts, but because of electrode polarization, the applied voltage must be increased to about 0.6 volts before significant reaction takes place. In practice, additional voltage is required in order to overcome the electrical resistance of the acid in the electrolysis cell. At higher potentials, 1.7 volts and above, electrolysis of water commences to form oxygen and hydrogen. Under normal operations, the applied voltage can be adjusted to permit the electrolysis of sulfurous acid but to avoid the electrolysis of water.

In the electrolysis of sulfurous acid, the following reactions occur: At the anode,

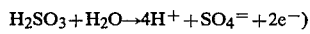

$$H_2SO_3 + H_2O \rightarrow 4H^+ + SO_4^= + 2e^-)$$

and at the cathode,

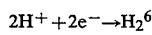

$$2H^+ + 2e^- \rightarrow H_2^6$$

The net reaction, therefore, is

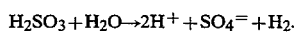

$$H_2SO_3 + H_2O \rightarrow 2H^+ + SO_4^= + H_2.$$

Instead of using a separate anode and cathode for electrolysis, the present invention makes use of a bipolar electrode in the form of the column packing. Bipolar electrodes are well known in the art. Such an electrode is comprised of a bed of solid particles or bodies which forms a medium of relatively low electrical conductivity. In conventional use, a liquid electrolyte flows through the bed. At the same time a direct current is passed through the particles of the bed, forming oppositely charged sites on the surfaces. The desired electrochemical reactions take place at these charged sites.

The bipolar cell used in the present invention differs from conventional design. Instead of passing a liquid electrolyte through the bed so that the particles are completely immersed, the flue or vent gas containing the sulfur dioxide flows through the bed. The solid particles or bodies are wetted by a film of acid which is sprayed or otherwise distributed on the particulate bed. Thus, most of the void space is filled by the gas stream.

Certain characteristics of the particulate bed are favorable for bipolarity. Relatively high electrical resistance at the contact points between particles in the bed is desired. Particles that have sharp edges and are loosely packed are helpful in this regard. The particles should be fabricated from materials with comparatively poor electrical conductivity. Thus, graphite is preferred in this application. Another material of choice is Duriron, a ferro silicon alloy that is well known for its corrosion resistance in acid media.

The voltage applied across the packed bed will depend on its electrical characteristics and its geometry. Because of the multiplicity of electrically charged sites, the applied voltage will surpass that needed for a single cell, namely, 0.6 volts. The voltage actually used will depend on the design parameters mentioned above and on such operating conditions as the current required to electrolyze all of the sulfurous acid formed. In essence, a bipolar electrode is equivalent to an electrical circuit containing a multitude of conventional cells in series. An advantage of this arrangement is that the applied voltage does not need to be stepped down so far and the current is correspondingly reduced.

Because the present invention contemplates operating the electrolysis step completely within the confines of the scrubbing zone, the hydrogen gas released at the electrode will enter the flue gas stream. The concentration of hydrogen gas resulting from this source, however, will be small. The hydrogen gas concentration in the exiting flue gas is limited by the level of sulfur dioxide initially present in the gas. When the process is used to scrub flue gases generated by the burning of high sulfur coal or vent gases released from contact sulfuric acid plants, the resulting hydrogen concentration will typically be in the order of 0.2 percent. This value is substantially below the explosive limit for hydrogen in dry air, namely 18 percent.

Notwithstanding the wide margin of safety afforded by the low hydrogen concentrations, certain precautionary features designed into the process ensure trouble-free operation. These features include the installation of an exit gas analyzer (not shown) to measure the concentrations of sulfur dioxide and of hydrogen. A gas flowmeter (not shown) will warn of any upsets in the system. In addition, electric current and voltage limiting devices (not shown) prevent the occurrence of side reactions, e.g., the electrolysis of water. Balancing these safety measures, there is an important advantage of the present invention. Since pure hydrogen is not collected in the process, there is no danger of this gas inadvertently leaking to the atmosphere and forming explosive mixtures. An extremely hazardous material, namely, hydrogen gas, is avoided by the present invention.

Because of the corrosive nature of sulfuric acid solutions, the selection of materials of construction is critical. Those parts of the equipment in contact with acid that must be electrically conductive, e.g., the electrical contacts, are suitably fabricated from graphite, lead or the noble metals such as platinum. In addition, certain newer metals like zirconium show promise in this application. Other parts that are non-conductive can be made using a wide choice of materials that have been tested with good results in such applications.

Figure 1:
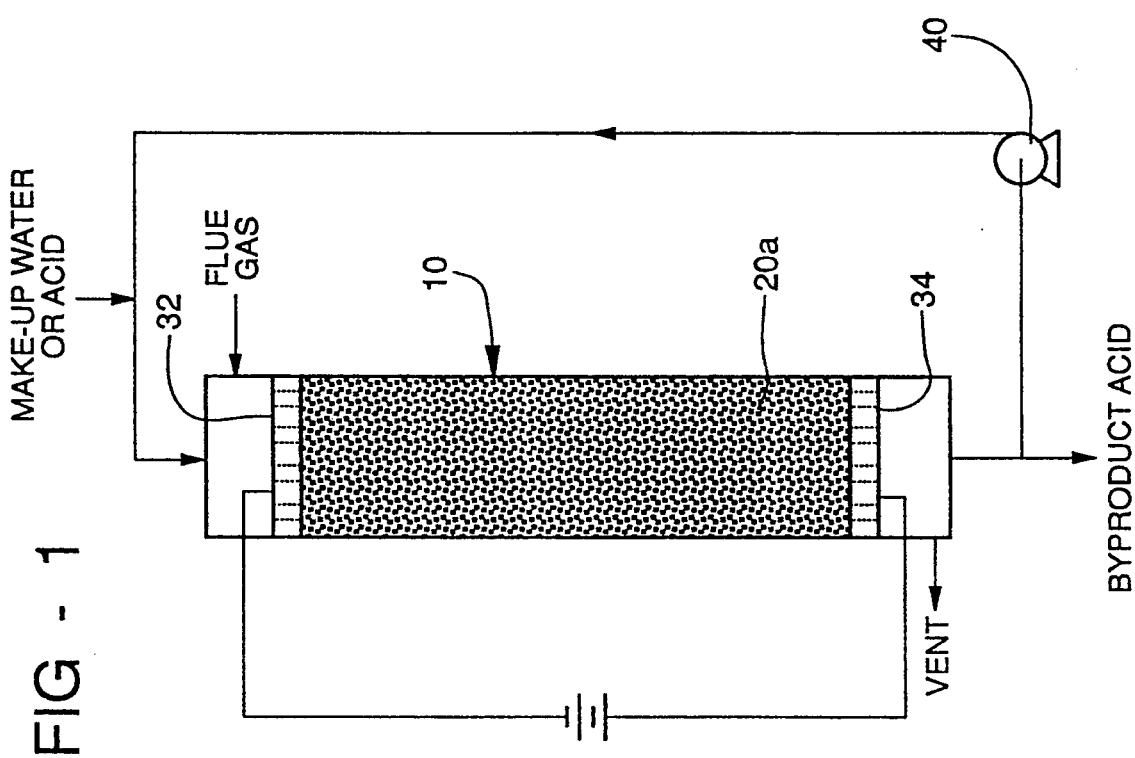
FIG. 1 is a diagrammatic view of the scrubber/electrolyzer in which the packing material serves as both the contact surface for scrubbing and the bipolar electrode. A pump is provided to circulate acid through the scrubber.

One of the preferred embodiments of the invention as described above is shown in FIG. 1. Flue gas enters at the top of the scrubbing column 10 and flows concurrently with the acid down the column. In this manner, column loadings can be increased over the expected gas flow rates for counter-current operations. A circulating pump 40 supplies sufficient acid to the column 10 to wet the column packing 20a. Another preferred embodiment of the invention is shown in FIG. 2. The inner wall 36 of the column 10 and a centrally located cylinder 38 serve as electrical contacts and replace the electrical contacts at the top and bottom of the packing.

Byproduct sulfuric acid is removed from the system during operation of the herein described embodiments of the process. Make-up water or acid is supplied to the acid stream as required to maintain the acid concentration within certain limits. The selected concentration of the acid is a compromise between competing requirements. The electrical conductivities of aqueous sulfuric acid are greatest in the range of 20 weight percent to 40 weight percent. At lower and higher concentrations, the conductivities are reduced but still appreciable within the range of 5 weight percent to 93 weight percent. Balancing the need to maximize the electrical conductivity of the acid is the desire to produce byproduct acid of maximum strength. Concentrated acid has greater utility than weak acid and also is cheaper to ship on an equivalent acid basis. Because the present invention uses a bipolar electrode, acid with higher concentrations can be used in the process for scrubbing without increasing the electrical resistance excessively.

The present invention will be further illustrated by the following examples:

EXAMPLE 1

Engineering data were developed for a scrubber to treat the stack gases from a 500 megawatt power plant burning coal with a 2% sulfur content. The scrubber was based on the design disclosed in U.S. Pat. No. 4,830,718, such that the column packing served also as the anode, and the cathode was placed in a separate compartment. Assuming a generating efficiency of 30% and a scrubbing efficiency of 95%, the size of the scrubbing column was determined to be 103 ft. high and 52 ft. in diameter. The necessary electrical current was $7.37 \times 10^6$ amps. Assuming in the extreme case that the column was flooded, the current density in the column was $7.94 \times 10^3$ amps. per $cm^2$. Using 40% sulfuric acid with an electrical resistance of 1.47 ohm cm., the voltage drop equalled $1.17 \times 10^4$ volts per cm. This result showed the impracticality of this scrubber design for large power plants.

EXAMPLE 2

A scrubber was designed for the same power plant as in Example 1 but using the bipolar process of the present invention. In this case, 1-inch graphite saddles were used. This packing has a surface area of 79 $ft^2$ per $ft^3$. The total surface of the packing in the column equalled $1.58 \times 10^{10}$ $cm^2$. Thus, the current density was equal to the 0.47 milliamps per $cm^2$ of packing. Assuming that only 10% of the surface contained positively charged sites, the current density at these sites was 4.7 milliamps per $cm^2$. This value compared favorably with experimental data which show a cell potential of close to 0.6 volts at this current density.

The embodiments of the invention in which exclusive property or privilege is claimed are defined as follows:

What is claimed is:

1. A process for the mitigation and control of air pollution caused by the emission of sulfur dioxide in effluent vent, flue or exhaust gas, said process comprising the removal of sulfur dioxide from a stream of such effluent vent, flue or exhaust gas by scrubbing the gas in a column with aqueous sulfuric acid to solubilize and remove sulfur dioxide from the gas, said column containing electrically conductive packing material which serves both as a gas-liquid film contact surface for scrubbing and as the electrochemically active surface of a bipolar electrode, and two electrical contacts arranged so that the bed of packing material is spaced between the contacts and is in electrical contact with said contacts;

applying an electrical potential across said two contacts in excess of about 0.6 volts in order to effect electrolysis; and maintaining the concentration of the aqueous sulfuric acid by means of make-up water or acid.

2. A process according to claim 1, wherein the electrically conductive packing material is fabricated from graphite.

3. A process according to claim 1, wherein the electrically conductive packing material is fabricated from ferro silicon alloy.

4. A process according to claim 1, wherein the two electrical contacts are arranged one at the top and the other at the bottom of the packing material.

5. A process according to claim 1, wherein the two electrical contacts comprise the inner wall of the column and a cylinder centered on the vertical axis of the column.

6. A process according to claim 1, wherein the range of concentrations of the aqueous sulfuric acid is between about 5 weight percent and 93 weight percent.

7. A process according to claim 1 comprising the withdrawal of byproduct aqueous sulfuric acid from the acid stream.

8. A process according to claim 1, wherein the electrolysis comprises the reaction $$H_2SO_3 + H_2O \rightarrow 2H^+ + SO_4^= + H_2.$$

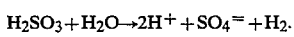

9. Aqueous sulfuric acid produced by a process according to claim 7.

* * * * *

UNITED STATES PATENT AND TRADEMARK OFFICE
CERTIFICATE OF CORRECTION

PATENT NO. : 5,344,529
DATED : Stauffer
INVENTOR(S) : September 6, 1994

It is certified that error appears in the above-indentified patent and that said Letters Patent is hereby corrected as shown below:

Column 3, line 51, delete ")" and insert --,--;

Column 3, line 55, delete "$H_2^6$" and insert --$H_2$.--;

Front page, delete "4830178" and insert --4830718--.

Signed and Sealed this

Twenty-second Day of November, 1994

Attest:

BRUCE LEHMAN

Attesting Officer

Commissioner of Patents and Trademarks